G. MOORE.
REPLACING PROCESS.
APPLICATION FILED MAR. 9, 1914.
1,114,018.
Patented Oct. 20, 1914.
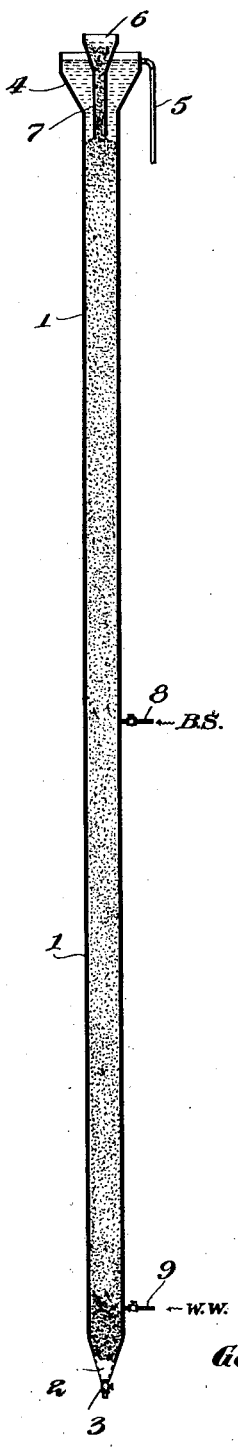
Witnesses
N. H. Lybrand
C. H. Fesler.
Inventor
George Moore
By
Edgar M. Kitchin,
his Attorney

UNITED STATES PATENT OFFICE.

GEORGE MOORE, OF JOPLIN, MISSOURI.

REPLACING PROCESS.

1,114,018.  Specification of Letters Patent.  Patented Oct. 20, 1914.

Application filed March 9, 1914. Serial No. 823,501.

*To all whom it may concern:*

Be it known that I, GEORGE MOORE, a citizen of the United States, residing at Joplin, in the county of Jasper and State of Missouri, have invented certain new and useful Improvements in Replacing Processes; and I do hereby declare the following to be a full, clear, and exact description of the invention, such as will enable others skilled in the art to which it appertains to make and use the same.

As a convenient method of disclosing the process, I have indicated in the accompanying drawing an apparatus capable of carrying out the steps thereof in which drawing the figure is a diagrammatic showing.

Referring to the drawing by numerals, 1 indicates a container having a contracted discharge 2 controlled by valve 3. The upper end of container 1 is formed with an enlargement 4 from which solutions are discharged through pipe 5. A hopper 6 is supported on the enlargement 4, and is provided with a tubular extension 7 projecting down into the container 1. A barren solution supply pipe 8 communicates with the container 1 at an intermediate point in its length, and a wash water supply pipe 9 communicates with tank 1, near the lower end thereof. Each pipe 8, 9, is appropriately valved.

In carrying out the process by utilizing the apparatus above described, ore with its dissolving solution is fed through hopper 6 into container 1 until the container is filled substantially up to the lower end of the extension 7, valve 3 being closed during the filling operation. Water is then introduced through pipe 9 under sufficient pressure to flow upwardly and replace the metal-bearing solution, which flows out through pipe 5. As soon as the metal-bearing solution which accompanies the first charge of ore is discharged from the container, a continuous supply of ore with its accompanying metal-bearing solution is delivered to hopper 6, and valve 3 is opened to allow discharge of tailings proportional to the intake of ore. At the same time barren solution is introduced through pipe 8 and water through pipe 9 under the requisite pressure for moving upwardly in the column of sands and slimes comprising the ore in the container 1.

As the sands and slimes slowly descend under retarded gravity action, the barren solution ascends, replacing and driving upwardly the metal-bearing solution which continually discharges through pipe 5. At the same time, the wash water rising in the descending column of sands and slimes replaces and drives upwardly the barren solution, so that the solids passing the intake point for wash water have been deprived of all soluble values, and pass out through valve 3 as tailings containing only water as moisture. It is to be particularly noted that the retardation of the gravity action incident to the restricted area of the discharge at the lower end of the column of sands and slimes makes effective the pressure of such column to cause the exclusion of an excess of water in the discharged tailings.

The inflow of barren solution and wash water is proportioned relative to the supply of ore and metal-bearing solution through hopper 6 so that the metal-bearing solution is not permitted to diffuse as low as the intake for the barren solution, and the barren solution is not permitted to diffuse to a point as low as the intake for the wash water. The sands form a substantially solid, compact column.

In cases where it is desirable to treat slimes alone or ore containing an excess of slimes, an appropriate amount of sands is added and the sand tailings may be washed for reuse in this way.

This process is applicable to untreated ore in which case the dry ore is introduced and the ascending barren solution acts as a solvent as well as a replacing solution and the wash water acts as above described.

In the carrying out of the process, the functions of the sand particles are to provide a multiplicity of surfaces on which the slimes settle, to provide gravity carriers for the settled slimes, and to provide contact surfaces for slimes cohesion. The interstices between the sand particles are so small that the slime solids need travel but a short distance to find lodgment on the underlying grains of sand, and this condition brings about a greatly augmented settling rate, as compared with slimes settling in a tank which is not provided with settler surfaces other than the bottom of the tank.

It is to be observed that the relative movements of the ore and solutions are sufficiently slow to largely avoid interference with the settling of the slimes, or with their settled state. It is also to be observed that one of the conditions rendering this process practical is that the column is long relative to its diameter, so that there will be a direct advance of replacing fluids, thus avoiding excessive diffusion.

What I claim is:—

The process of treating metal bearing material consisting of sands and slimes which comprises moving a compact column of such material downwardly while moving a fluid upwardly in contact with the material and retarding the movement to prevent agitation and separation of the sands and slimes.

In testimony whereof I affix my signature in presence of two witnesses.

GEORGE MOORE.

Witnesses:
N. CURTIS LAMMOND,
E. E. DAY.